United States Patent [19]

Stevens

[11] Patent Number: 4,794,267
[45] Date of Patent: Dec. 27, 1988

[54] ANTI-LOCK BRAKING SYSTEM CHECK VALVE WITH BUILD ORIFICE

[75] Inventor: William L. Stevens, Dowagiac, Mich.

[73] Assignee: Allied-Signal Inc., Morristown, N.J.

[21] Appl. No.: 50,350

[22] Filed: May 18, 1987

[51] Int. Cl.$^4$ .......................... B60T 15/46; B60T 8/42
[52] U.S. Cl. .................................... 303/115; 303/84.1
[58] Field of Search .............. 303/6 C, 112, 113, 115, 303/117, 118, 84.1, 84.2

[56] References Cited

U.S. PATENT DOCUMENTS

| | | | |
|---|---|---|---|
| 3,506,312 | 4/1970 | Siddall | 303/6 C |
| 3,608,984 | 9/1971 | Skoyles | 303/115 |
| 3,726,568 | 4/1973 | Krugler, Jr. | 303/115 |
| 3,969,001 | 7/1976 | Nakamura et al. | 303/115 X |
| 4,457,563 | 7/1984 | Farr | 303/115 X |

Primary Examiner—Andres Kashnikow
Assistant Examiner—Matthew C. Graham
Attorney, Agent, or Firm—Leo H. McCormick, Jr.; Ken C. Decker

[57] ABSTRACT

A valve assembly for use in an anti-lock braking system has a housing with a bore having a first inlet connected to a master cylinder and an outlet connected to a pressure responsive anti-lock braking system modulator valve. The bore has a second inlet connected to a source of pressurized brake fluid and a passage which connects the second inlet to the outlet passage. A check valve provided in the passage to prevent fluid flow from the first inlet passage to the second inlet. A valve responsive to a differential pressure between the pressurized source and the master cylinder inlet is provided for closing the first inlet while opening the second inlet to allow the source of pressurized brake fluid to be supplied to the modulator valve.

1 Claim, 1 Drawing Sheet

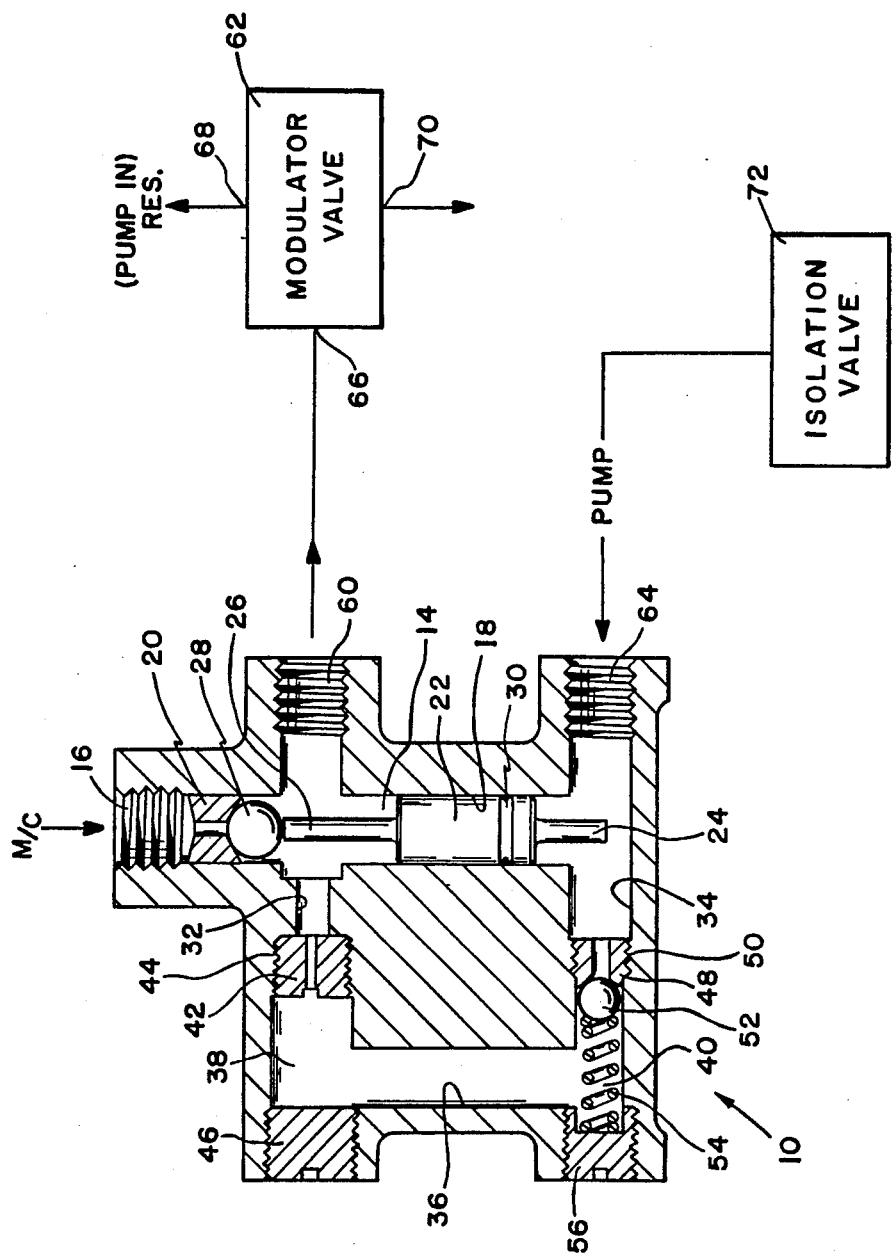

ANTI-LOCK BRAKING SYSTEM CHECK VALVE WITH BUILD ORIFICE

BACKGROUND OF THE INVENTION

The present invention relates to valves utilized to control the application of braking pressure by an anti-lock braking system and in particular to a valve for use in such systems utilizing simple on-off control of braking pressure.

Low cost anti-lock braking systems have been developed wherein modulation of the braking force is effected by means of a single build/decay modulating valve for each channel of the anti-lock braking system. The single modulating valve is operable between two states to provide build and decay of braking pressure and such a modulating valve can be provided for operation by a single solenoid and a shuttle valve element responsive to a differential pressure between a wheel brake cyinder and a source of pressurized braking fluid. This type of system is commonly referred to as a "bang bang" system inasmuch as the transition between build and decay is relatively harsh and the system is typically not capable of operating in a pressure hold state. To minimize the harshness of the transition between build and decay modes, it has been a common practice to provide a flow controlling orifice in the valve which limits the rate of pressure build. Unfortunately the required orifice must be relatively small and as a result the orifice is subject to contamination. Because the orifice is typically incorporated into a shuttle valve element within the modulator valve, alteration of the orifice and correspondingly the build rate is not easily effected. Further, the orifice provided in the modulator valve can exhibit false shuttling of the shuttle valve element during normal braking, typically, during spike applications of the brakes.

There therefor exists a need for a valve that can be utilized with an anti-lock braking system which will obviate these disadvantages.

Broadly, the present invention is a valve assembly for use in an anti-lock braking system. The valve is provided with a first fluid passage having an inlet connected to a master cylinder and an outlet connected to a pressure responsive anti-lock braking system modulator valve. A second fluid passage having a flow control orifice therein has an inlet connected to source of pressurized brake fluid and an outlet connected to the modulator valve. A check valve is provided in the second passage for blocking fluid flow from the first passage to the pressurized source inlet. Valve means responsive to a differential pressure betwee the pressurized source and the master cylinder inlet is provided for closing the master cylinder inlet.

In specific embodiment of the invention, the valve means includes a piston operably connected between the master cylinder inlet and the pressurized source inlet to close the master cylinder inlet when the pump pressure exceeds the master cylinder pressure.

It is therefor an object of the invention to provide an orifice valve for use in anti-lock braking systems.

Another object of the invention is to provide such a valve which includes a flow control orifice which is operable in the system only during anti-lock braking operation.

Still another object of the invention is to provide such a valve in which the flow control orifice is readily changed.

Another object of the invention is to provide such a valve including a differential pressure responsive piston effective to connect a flow control orifice into the braking system during anti-lock braking operation.

Still another object of the invention is to provide such a valve in which a differential pressure piston provides positive isolation of the anti-lock braking system from the master cylinder.

BRIEF DESCRIPTION OF THE DRAWING

These and other objects and purposes of the invention and the invention itself will be best understood in view of the following detailed description thereof taken into conjunction with the appended drawing showing a sectional view of an anti-lock braking system check valve with a build orifice in accordance with the invention.

DESCRIPTION OF THE PREFERRED EMBODIMENT

Referring now to the drawing, there shown an orifice valve assembly indicated generally at 10. The assembly comprises a valve body 12 in which is formed a first bore 14 which defines a master cylinder inlet port 16 and a piston chamber 18. Adjacent master cylinder inlet port 16 is fitted a valve seat 20. A piston 22 is slidably received in the piston chamber 18. Piston 22 is provided at its lower end (as viewed in the drawings) with a stroke limiting pin portion 24 and at its opposite end with an actuating pin portion 26. A ball valve 28 sits against the valve seat 20, ball valve 28 being actuated by the pin portion 26. Fluid tight engagement between piston 22 and piston chamber 18 is provided by an "O" ring 30.

A second cylindrical bore 32 extends into the body 12 intersetting the bore 14 and extending orthogonally with respect thereto. A third bore 34 extends into the body 12, bore 34 also intersecting the bore 14 and extending in generally parallel, spaced-apart relationship to the bore 32. A fourth bore 36 extends through the body 12 joining bores 32 and 34 at their ends 38, 40, respectively.

A flow limiting orifice element 42 is fixedly mounted in the bore 32 by means such as threads 44 and the end 38 of the bore 32 is closed by a suitable plug as at 46.

A ball valve assembly 48 is fixedly mounted in the bore 34, assembly 48 including a valve seat 50, ball valve 52, and a spring 54. The bore 32 is closed at its end 40 by a suitable plug 56.

End 60 of bore 32 is provided with threads and defines an outlet port which is connected to an anti-lock braking system modulator valve 62. The end 64 of bore 34 is provided with threads and is connected to an anti-lock braking system pump and accumulator assembly (not shown).

Together bore 14 and bore 32 define a fluid passage extending from a vehicle master cylinder (not shown) to the anti-lock braking system modulator valve 62, a second fluid passage extending from the anti-lock braking system pump and accumulator assembly (not shown) to the anti-lock braking system modulator valve 62, this fluid passage including a flow control orifice 42. Valve assembly 48 is oriented such that it will permit flow from the anti-lock braking system pump through the flow control orifice 42 to the modulator valve 62 and will block the passage of fluid from the master cylinder inlet port 16 back to the pump and the accumulator assembly.

The modulator valve 62 is typically a three-way valve having its inlet port 66 connected to the valve assembly 10 of the present invention and alternately open outlet ports 68 and 70 which are connected to the pump inlet and a brake wheel cylinder, respectively.

During normal braking operation, the modulator valve 62 provides fluid communication between its inlet port 66 and wheel cylinder outlet port 70. Fluid pressure at the pump inlet port 64 is at substantially zero pressure. In some systems this will be effected by non-operation of the pump when the anti-lock braking system is not functioning in other systems by reasons of an isolation valve 72 blocking communication between the pump and the inlet port 64. As a consequence, fluid pressure at master cylinder inlet port 16 will force the ball valve 28 into an open position and normal communication between the master cylinder (not shown) and the brake wheel cylinder is established.

When the anti-lock braking system is energized as a consequence of the system sensing an imminent wheel skid condition, either the pump and accumulator assembly will be energized or the isolation valve 72 is energized thereby applying pressurized braking fluid to the inlet ports 64. This fluid pressure will act against the piston 22 causing it to move upwardly (as viewed in the drawings) to close the valve 28. Pressurized fluid will flow through the valve assembly 48 and flow control orifice 42 and outwardly through port 60 to the modulator valve 62. This pressurized braking fluid will be applied to the brake wheel cylinders when the modulator valve 62 is a position to connect inlet port 66 to its outlet port 70. When the modulator valve is operated to its alternate position, the pressurized braking fluid is blocked from reaching the wheel cylinders and fluid pressure at the wheel cylinders is relieved or decayed through the modulator valve 62 back to the pump inlet via modulator vave 62 outlet port 68. When the modulator valve 62 again operates to connect inlet port 66 to outlet ports 70, pressurized braking fluid will again be applied from inlet port 64 through flow control orifice 42 and on to the wheel cylinders.

It will now be seen that the valve assembly of the present invention provides several necessary functions for the anti-lock braking system. The assembly provides positive isolation between the master cylinder and the wheel cylinders during anti-lock braking operation. The assembly provides communication from the source of pressurized brake fluid to the modulating valve 62 during anti-lock braking operation. The valve 10 provides a flow control orifice 42 which can be used to control the rate of increase of braking pressure at the wheel cylinders when the anti-lock braking system calls for building of brake pressure.

It will also be seen that the flow control orifice 42 is effectively removed from the normal brake hydraulic system during normal braking and is actively present in the system only during anti-lock braking. It will further be seen that the flow control orifice 42 can be readily changed thereby enabling simple and reliable alteration of brake fluid pressure build rates. Because the flow control orifice 42 is present in the system only during anti-lock braking operation, the pressure drops across the orifice do not affect the braking system during normal braking thereby obviating false shuttling of differential pressure sensitive modulator valves such as disclosed in co-pending U.S. patent application Ser. No. 926,150 filed Nov. 3, 1986 and commonly assigned with the present invention.

Although the present invention has been illustrated and described in connection with example embodiments it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. In an anti-lock braking system having an orifice valve through which fluid from a master cylinder and a pump is communicated to a modulator valve to selectively supply pressurized fluid to a wheel brake cylinder, the improvement in the orifice valve comprising:

a housing having a bore therein with a first inlet port connected to said master cylinder, a second inlet port connected to said pump, an outlet port connected to said modulator valve, and a passage connecting said second inlet port with said outlet port;

a piston located in said bore for separating said first inlet port from said second inlet port, said piston having a first and second pins extendings therefrom to limit the movement in said bore;

a first spherical member located in said passage;

a resilient member for urging said first spherical member toward a first seat to prevent the flow of fluid from the outlet port toward said second inlet port;

a fixed area opening member located in said passage for controlling the rate at which fluid from said pump may be communicated to said outlet port; and a second spherical member located in said bore adjacent a second seat surrounding said first inlet port, said master cylinder communicating fluid having a first pressure to said first inlet port, said first pressure acting on and moving said second spherical member away from said second seat to allow said fluid from the master cylinder having a first fluid pressure to freely flow to said modulator valve through said outlet port, said first fluid pressure being communicated through said fixed area opening member in said passage to assist said resilient member in holding said first spherical member against said first seat and thereby isolating said fluid from said master cylinder from said pump, said pump responding to an operational input to supply fluid with a second fluid pressure to said second inlet port, said second fluid pressure acting on said piston by moving said second spherical member into engagement with said second seat to interrupt communication through said first inlet port while acting on said first spherical member to overcome said first resilient member and allow said second fluid pressure to be communicated to said passage, said fixed area opening member controlling the rate at which said fluid having the second fluid pressure is presented to said modulator valve.

* * * * *